United States Patent Office 2,962,477
Patented Nov. 29, 1960

2,962,477

REDUCED COPOLYMERS

Joseph A. Blanchette, East Longmeadow, Mass., assignor to Monsanto Chemical Company, St. Louis, Mo., a corporation of Delaware No Drawing. Filed Sept. 19, 1956, Ser. No. 610,705

2 Claims. (Cl. 260—63)

This invention relates to new copolymers of monovinylidene aromatic compounds. More particularly, the invention relates to reduced copolymers of monovinylidene aromatic compounds and alkyl vinyl ketoximes.

In many applications it is necessary or desirable that a polymer contain reactive groups. In the case of styrene polymers and the like, it is often particularly desirable that these reactive groups be substituted on the backbone of the polymer molecule rather than on the phenyl nuclei, e.g., in coating compositions, where the presence of the reactive groups on the backbone imparts greater flexibility and adhesion properties to the composition than is obtained when the reactive groups are on the phenyl nuclei.

One object of this invention is to provide new copolymers of monovinylidene aromatic compounds.

Another object is to provide copolymers of monovinylidene aromatic compounds wherein reactive groups are substituted on the backbone of the polymer molecule.

Another object is to provide reduced copolymers of monovinylidene aromatic compounds and alkyl vinyl ketoximes.

A further object is to provide processes for preparing such copolymers.

These and other objects are attained by reacting hydroxylamine hydrochloride with a copolymer of a monovinylidene aromatic compound and an alkyl vinyl ketone and reducing the resultant oxime copolymer.

The following examples are given to illustrate the invention. Parts mentioned are parts by weight.

*Example I*

Five parts of hydroxylamine hydrochloride and 5 parts of a styrene-methyl vinyl ketone copolymer containing 60% by weight of styrene and having a molecular weight of about 30,000 are dissolved in a mixture of 24 parts of absolute ethanol and 30 parts of dry pyridine. The mixture is refluxed for 48 hours and then poured into cold water. A styrene-methyl vinyl ketoxime copolymer is isolated as a clean white solid.

*Example II*

A reaction vessel is charged with a suspension of 5 parts of lithium aluminum hydride in 44 parts of tetrahydrofuran. A solution of 3 parts of the oxime copolymer of Example I in 44 parts of tetrahydrofuran is added with agitation to the suspension of lithium aluminum hydride under such conditions that the reaction mixture begins to reflux gently. When all of the polymer solution has been added, the reaction mixture is refluxed for an additional 1–2 hours and then poured into water. The pH is adjusted to 8–10, and the polymer is removed from the reaction mixture by filtration. The polymer is further purified by dissolving in methyl ethyl ketone and adding the solution dropwise to water to reprecipitate the polymer. Infra-red analysis shows that all of the oxime groups have been converted to amino groups. The product is molded between metal plates at about 160° C. under moderate pressure to yield a flexible article.

*Example III*

Five parts of hydroxylamine hydrochloride and 5 parts of a styrene-methyl vinyl ketone copolymer containing 80% by weight of methyl vinyl ketone and having a molecular weight of about 25,000 are dissolved in a mixture of 24 parts of absolute ethanol and 30 parts of dry pyridine. The mixture is refluxed for 48 hours and then poured into cold water. A styrene-methyl vinyl ketoxime copolymer is isolated as a clean white solid.

*Example IV*

A reaction vessel is charged with a solution of 5 parts of the oxime copolymer of Example III in 44 parts of tetrahydrofuran. A suspension of 5 parts of lithium aluminum hydride in 44 parts of tetrahydrofuran is added to the solution with agitation under such conditions that the reaction mixture begins to reflux gently. When all of the lithium aluminum hydride suspension has been added, the reaction mixture is refluxed for an additional 1–2 hours and then poured into water. The pH is adjusted to 8–10, and the polymers is removed from the reaction mixture by filtration. The polymer is further purified by dissolving in methyl ethyl ketone and adding the solution dropwise to water to reprecipitate the polymer. Infra-red analysis shows that all of the oxime groups have been converted to amino groups. The product is dissolved in dioxane to form a solution of 50 parts of polymer in 50 parts of solvent. The solution is cast onto a glass plate to form a clear, flexible film.

The copolymers which are reacted with hydroxylamine hydrochloride and then reduced to form the products of this invention are copolymers of monovinylidene aromatic compounds and alkyl vinyl ketones containing 1–99% by weight of the monovinylidene aromatic compound and, correspondingly, 99–1% by weight of the alkyl vinyl ketone. These copolymers have molecular weights ranging from about 10,000 to 50,000 and may be prepared by conventional procedures, e.g., by mass, solution, or emulsion polymerization techniques. The monovinylidene aromatic component is a member of the group consisting of styrene, alpha-methyl styrene, and ar-substituted derivatives thereof wherein the ar-substituents may be halogens, hydroxy groups, carboxyl groups, or aliphatic hydrocarbon radicals containing 1–4 carbon atoms. The alkyl vinyl ketone is one wherein the alkyl radical contains 1–5 carbon atoms. Mixtures of the monovinylidene aromatic compounds and mixtures of the alkyl vinyl ketones may be used in making the copolymers.

The monovinylidene aromatic compound-alkyl vinyl ketone copolymers are reacted with hydroxylamine hydrochloride at reflux temperatures to convert the carbonyl group to oxime groups. The resultant monovinylidene aromatic compound-alkyl vinyl ketoxime copolymers may be reduced by the process used in the examples, i.e., by reduction with lithium aluminum hydride, or by any of the other conventional reduction techniques, e.g., by hydrogenation over metallic hydrogenation catalysts such as Raney nickel, copper-chromium oxide, etc. When the copolymers are reduced with lithium aluminum hydride, 1–3 moles of reducing agent are used per mole of combined alkyl vinyl ketoxime. The reaction is accomplished in a solvent for the copolymer such as tetrahydrofuran, dioxane, diethyl ether, benzene, etc. at reflux temperatures. The polymer-lithium aluminum hydride complex which is formed is decomposed by the use of a hydrolyzing agent, e.g., water, ethanol, ethyl acetate, etc.

The products of this invention are internally plasticized copolymers having amino groups substituted on the backbone of the polymer molecule. The number of amino groups in the reduced copolymers may be varied by varying the amount of alkyl vinyl ketone which is copolymerized with the monovinylidene aromatic compound. The reduced copolymers are soluble in organic solvents such as higher alcohols, esters, ethers, ketones, hydrocarbons, amides such as dimethylformamide, tetrahydrofuran, etc.

Compositions containing the polymers of this invention may be modified by the incorporation of conventional additives such as dyestuffs, fillers, extenders, lubricants, etc. The polymers may be used alone or in combination with other polymeric materials, e.g., with other vinylidene polymers.

The polymers of this invention are useful in forming fibers, filaments, sheets, films, molding compositions, textile treating compositions, etc. They are particularly useful in coating compositions for various surfaces such as wood, paper, metal, textiles, etc. Coatings containing these polymers are characterized by good properties of flexibility and adherence. The polymers also find application as polyelectrolytes.

The presence of the amino groups makes these polymers useful as precursors for further chemically modified polymers. For example, they may be reacted with polybasic acids or anhydrides to form polyamide type resins.

It is obvious that many variations may be made in the products and processes set forth above without departing from the spirit and scope of this invention.

What is claimed is:

1. A process which consists of reacting hydroxylamine hydrochloride under reflux conditions with a copolymer of an alkyl vinyl ketone wherein the alkyl radical contains 1–5 carbon atoms and a monovinylidene aromatic compound of the group consisting of styrene, alphamethyl styrene, and ar-substituted derivatives thereof wherein the ar-substitutent is a member of the group consisting of aliphatic hydrocarbon radicals containing 1–4 carbon atoms, halo, hydroxyl, and carboxyl substituents, and then subjecting the product of this reaction to the action of an agent capable of reducing oxime groups to amino groups under conditions suitable for such reduction.

2. A process which consists of refluxing a mixture of hydroxylamine hydrochloride and a copolymer of an alkyl vinyl ketone wherein the alkyl radical contains 1–5 carbon atoms and a monovinylidene aromatic compound of the group consisting of styrene, alpha-methyl styrene, and ar-substituted derivatives thereof wherein the ar-substituent is a member of the group consisting of aliphatic hydrocarbon radicals containing 1–4 carbon atoms, halo, hydroxyl, and carboxyl substituents, and then subjecting the product to the action of lithium aluminum hydride at reflux temperatures.

References Cited in the file of this patent

UNITED STATES PATENTS

| | | |
|---|---|---|
| 1,937,063 | Meisenburg et al. | Nov. 28, 1933 |
| 2,122,707 | Balthis | July 5, 1938 |
| 2,456,428 | Parker | Dec. 14, 1948 |

OTHER REFERENCES

Adams et al.: Organic Reactions, vol. VI (1951), p. 506, publ. by John Wiley & Sons, Inc., New York.

Gilman: Organic Chemistry, vol. 1, 2nd ed., p. 807 (April 1953), publ. by John Wiley & Sons, Inc., New York.

Marvel et al.: J. Am. Chem. Soc., vol 61, p. 3234 (1939).

UNITED STATES PATENT OFFICE
CERTIFICATION OF CORRECTION

Patent No. 2,962,477                                 November 29, 1960

Joseph A. Blanchette

It is hereby certified that error appears in the above numbered patent requiring correction and that the said Letters Patent should read as corrected below.

Column 2, line 24, for "polymers" read -- polymer --; lines 67 and 68, strike out "of combined alkyl vinyl ketoxime. The reaction is accomplished in a solvent for the copolymer such as tetra-" and insert the same after "mole" in line 64, same column.

Signed and sealed this 13th day of June 1961.

(SEAL)
Attest:

ERNEST W. SWIDER                                 DAVID L. LADD
Attesting Officer                                      Commissioner of Patents